(12) United States Patent
Seo

(10) Patent No.: US 11,256,298 B2
(45) Date of Patent: Feb. 22, 2022

(54) DISPLAY DEVICE

(71) Applicant: Samsung Display Co., Ltd., Yongin-si (KR)

(72) Inventor: Hae-Kwan Seo, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/021,038

(22) Filed: Sep. 15, 2020

(65) Prior Publication Data

US 2020/0409424 A1 Dec. 31, 2020

Related U.S. Application Data

(63) Continuation of application No. 14/882,815, filed on Oct. 14, 2015, now Pat. No. 10,782,737.

(30) Foreign Application Priority Data

Apr. 1, 2015 (KR) .................. 10-2015-0046009

(51) Int. Cl.
G06F 1/16 (2006.01)
G09G 3/00 (2006.01)

(52) U.S. Cl.
CPC ............. G06F 1/1652 (2013.01); G09G 3/03 (2020.08); G09G 3/035 (2020.08); G09G 2300/0408 (2013.01); G09G 2300/0426 (2013.01); G09G 2320/0223 (2013.01); G09G 2320/0233 (2013.01); G09G 2380/02 (2013.01)

(58) Field of Classification Search
CPC combination set(s) only.
See application file for complete search history.

(56) References Cited

U.S. PATENT DOCUMENTS

| 6,483,565 | B1 | 11/2002 | Hidehira et al. |
| 6,738,123 | B1 | 5/2004 | Takahashi et al. |
| 9,176,530 | B2* | 11/2015 | Rothkopf ................ G06F 3/041 |
| 9,805,639 | B2 | 10/2017 | Kim |
| 9,940,086 | B2* | 4/2018 | Yoshizumi ........ H01L 27/14681 |
| 2003/0066308 | A1 | 4/2003 | Radley-Smith |
| 2009/0251888 | A1* | 10/2009 | Douglas .................. G06F 1/163 362/103 |
| 2015/0001507 | A1 | 1/2015 | Kim et al. |
| 2015/0286253 | A1 | 10/2015 | Jung |
| 2016/0299526 | A1 | 10/2016 | Inagaki et al. |

FOREIGN PATENT DOCUMENTS

| CN | 1713791 | 12/2005 |
| CN | 101440941 | 5/2009 |
| CN | 101488518 | 7/2009 |
| CN | 103606343 | 2/2014 |

(Continued)

Primary Examiner — William Boddie
Assistant Examiner — Alecia D English
(74) Attorney, Agent, or Firm — Kile Park Reed & Houtteman PLLC

(57) ABSTRACT

A display device includes a substrate and a connector. The substrate includes a display area, a first pad area, and a second pad area. The display area has a plurality of pixels. The first pad area and the second pad area are adjacent respective sides of the display area and are connected to different ones of the pixels. The connector connects the first pad area and the second pad area when the substrate is bent.

14 Claims, 16 Drawing Sheets

(56) References Cited

FOREIGN PATENT DOCUMENTS

| JP | 2001-125122 | 5/2001 |
| JP | 2010-8480 | 1/2010 |
| KR | 10-2013-0109350 | 10/2013 |
| KR | 10-2014-0042183 | 4/2014 |
| KR | 10-2014-0060776 | 5/2014 |
| KR | 10-2014-0063304 | 5/2014 |
| WO | 2015/038684 | 3/2015 |

* cited by examiner

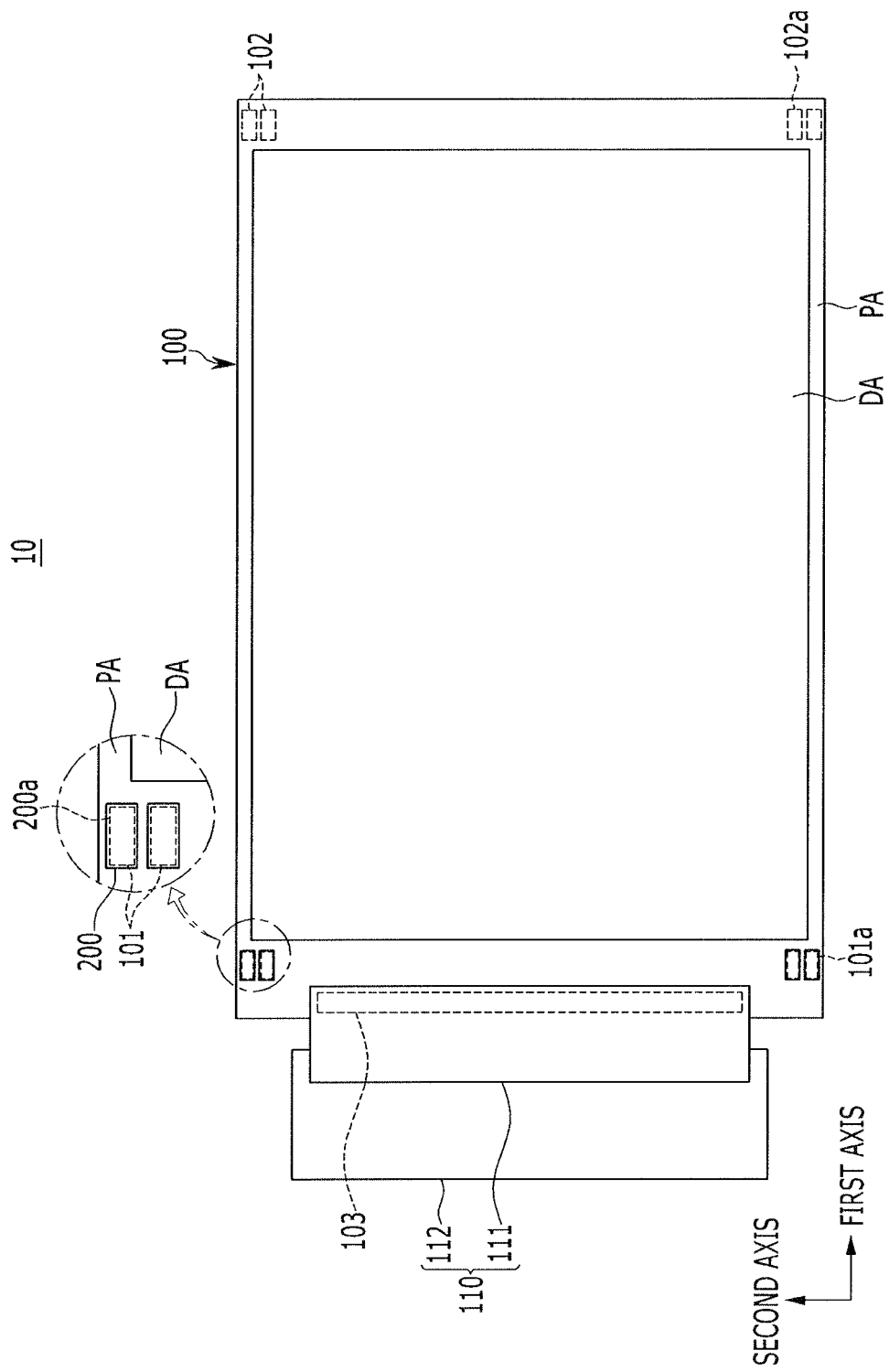

10c

DISPLAY DEVICE

CROSS-REFERENCE TO RELATED APPLICATION(S)

This is a continuation application based on currently pending U.S. patent application Ser. No. 14/882,815, filed on Oct. 14, 2015, the disclosure of which is incorporated herein by reference in its entirety. U.S. patent application Ser. No. 14/882,815 claims priority benefit of Korean Patent Application No. 10-2015-0046009, filed on Apr. 1, 2015 in the Korean Intellectual Property Office, the disclosure of which is incorporated herein by reference in its entirety for all purposes.

BACKGROUND

1. Field

One or more embodiments described herein relate to a display device.

2. Description of the Related Art

A flexible display bends or folds and thus is suitable for many applications. A flexible display includes pixel on a flexible substrate. The flexible substrate is made of a light-weight material (e.g., plastic) and is strong enough to withstand substantial impact. The pixel may include organic light emitting diodes, a liquid crystal display elements, or electrophoretic display elements. In such a flexible display, a driver for supplying power to the pixel is coupled to an end of the flexible substrate. As a result, luminance deviation occurs due to voltage drop of the power supplied to the pixels. This luminance deviation adversely affects display quality and visibility.

SUMMARY

In accordance with one or more embodiments, a display device includes a substrate including a display area, a first pad area, and a second pad area, the display area including a plurality of pixels, and the first pad area and the second area adjacent respective sides of the display area and connected to different ones of the pixels; and a connector to electrically connect the first pad area and the second pad area when the substrate is bent.

Opposite end portions of the substrate may overlap a predetermined extent when the substrate is bent. The first pad area may be adjacent a first one of the end portions, and the second pad area may be adjacent at a second one of the end portions. The display device may include a third pad area adjacent the display area and the first one of the end portions, wherein the first pad area is connected to the third pad area. The display device may include a driver to supply a power source voltage to the third pad area.

The first pad area and the second pad area may be on respective first and second surfaces of the substrate and overlap each other when the substrate is bent. The connector may be between the first pad area and the second pad area, and the first pad area and second pad area may respectively contact opposite surfaces of the connector. The first pad area and the third pad area may be on the first surface of the substrate and may be electrically connected to each other through a connecting wire.

The first pad area and the third pad area may be respectively on the first and second surfaces of the substrate, and may be electrically connected to each other through at least one contact hole through the substrate. The pixels may be on the first surface of the substrate, and the second pad area may be electrically connected to corresponding pixels through at least one contact hole through the substrate.

The first pad area and the second pad area may be on the substrate and are adjacent one another to within a predetermined distance when the substrate is bent. The connector may include a flexible material. The first pad area may be between a boundary of the display area and the first end portion, and the second pad area may be between the boundary of the display area and the second end portion. Opposite end portions of the substrate may overlap to within a predetermined distance when the substrate is bent. The substrate may include a flexible material. The substrate may have a cylindrical shape when bent.

In accordance with one or more other embodiments, a display device includes a first pad area; a second pad area; and a flexible substrate including a display area, wherein the first pad area is connected to the second pad area when the flexible substrate has an enclosed geometrical shape (e.g., circle, ellipse, square, rectangle, polygon, pyramid, cone, etc.), the first pad area and the second pad area are to deliver signals to pixels in the display area, and the display area on an outer surface of the flexible substrate when the flexible substrate has the enclosed geometrical shape.

The connector may be between the first and second pad areas when the flexible substrates has the enclosed geometrical shape. The first and second pad areas may be on opposing surfaces of the flexible substrate. The first and second pad areas may be on a same surface of the flexible substrate.

BRIEF DESCRIPTION OF THE DRAWINGS

Features will become apparent to those of skill in the art by describing in detail exemplary embodiments with reference to the attached drawings in which:

FIG. 1 illustrates an embodiment of a display device.

DETAILED DESCRIPTION

Figure 2A:
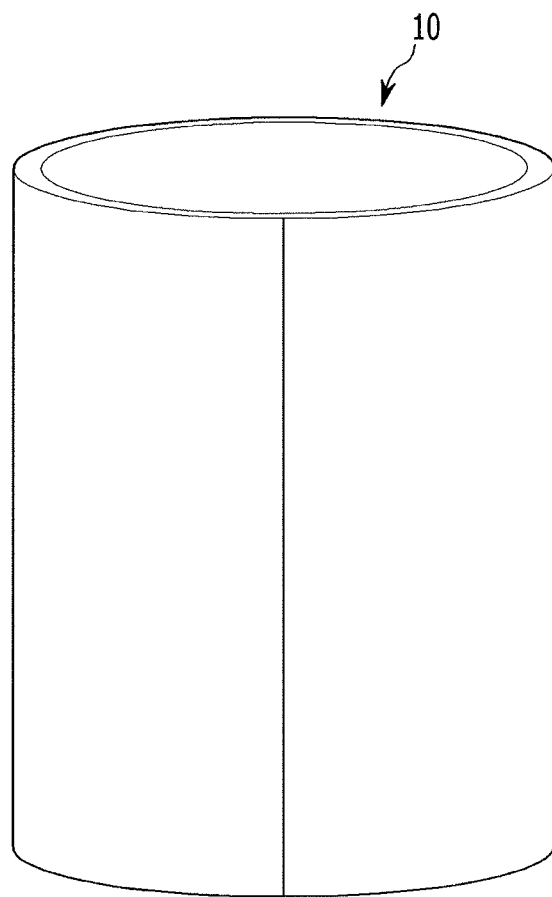
FIGS. 2A and 2B illustrate additional views the display device.

Example embodiments are described more fully hereinafter with reference to the accompanying drawings; however, they may be embodied in different forms and should not be construed as limited to the embodiments herein. Rather, these embodiments are provided so that this disclosure will be thorough and complete and will fully convey exemplary implementations to those skilled in the art.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout. The embodiments may be combined to form additional embodiments.

Figure 2B:
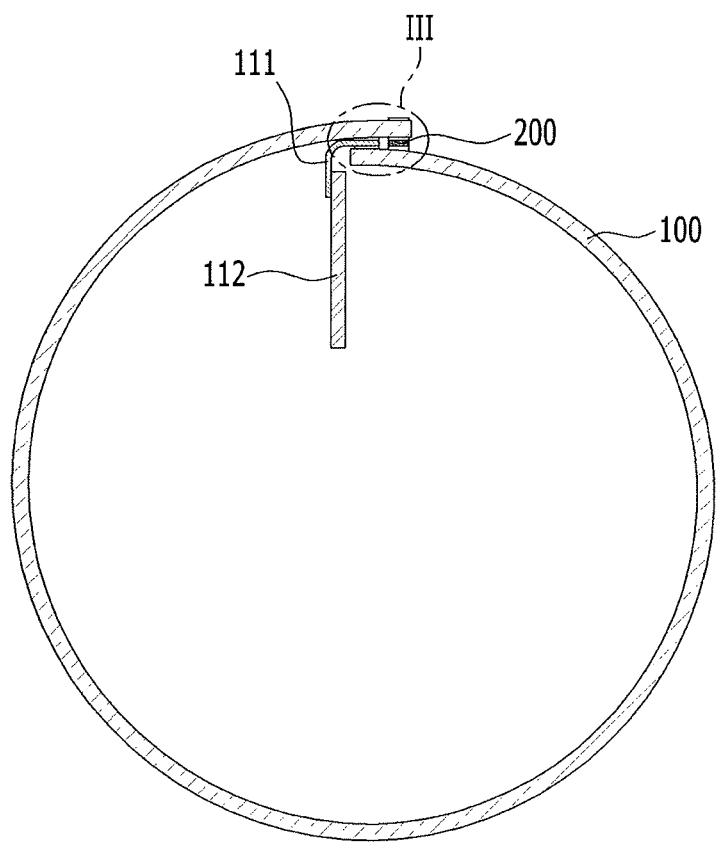
Figure 3:
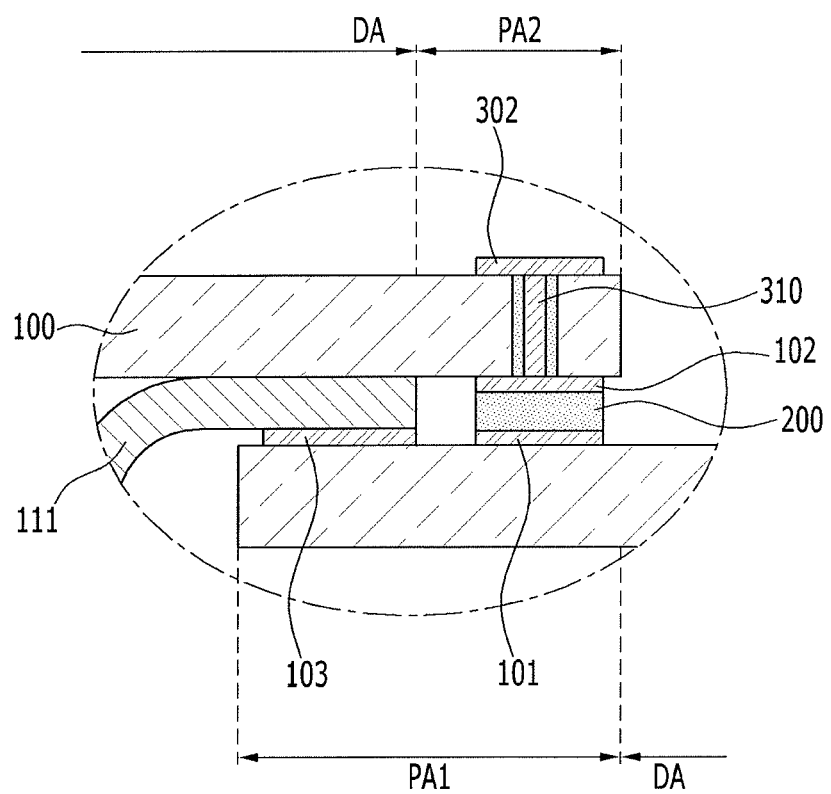
FIG. 3 illustrates an embodiment of a coupling structure.

FIG. 1 illustrates an embodiment of a display device 10. FIG. 2A illustrates a perspective view of the display device 10 bent in the shape of a cylinder, and FIG. 2B illustrates a cross-sectional view of the display device 10 in FIG. 2A. FIG. 3 illustrates an enlarged cross-sectional view of a coupling structure of a first pad unit and a second pad unit in the display device 10 in FIG. 2B.

Referring to FIG. 1, the display device 10 includes a display substrate 100 and a driver 110 for driving the display substrate 100. The driver 110 includes a driving integrated circuit 111 and a printed circuit board (PCB) 112. The display substrate 100 includes a plurality of pixels on a base substrate. Each pixel includes a pixel circuit for driving a display element The display elements may be, for example, organic light emitting diodes, liquid crystal display elements, or electrophoretic display element.

The display substrate 100 is a flexible display substrate in which a flexible substrate is employed as a base substrate thereof. The base substrate is made of a material having flexible characteristics. Examples include polyethyleneterephthalate, polyimide, polycarbonate, epoxy, polyethylene, or polyacrylate.

The display substrate 100 includes a display area DA including the pixels and a peripheral area PA adjacent the display area DA. The driver 110 is coupled to the peripheral area PA of the display substrate 100 and is electrically connected to the pixels in the display area DA. The driver 110 applies driving signals to the pixels The driving integrated circuit 111 is connected between the display substrate 100 and PCB 112, and is connected to connection pad unit or area 103 in the peripheral area PA of the display substrate 100, for example, through a conductive adhesion member or material. The driving integrated circuit 111 is electrically connected to the pixels through the connection pad unit 103.

The driving integrated circuit 111 is electrically connected and receives driving signals from the PCB 112. The driving integrated circuit 111 transfers the driving signals from the PCB 112 to the display substrate 100 through the connection pad unit 103. The driving signals may be, for example, gate signals and/or a data signals for driving the pixels in the display area DA. Also, power source voltages for driving the pixels are supplied to the display substrate 100 through the connection pad unit 103.

The driving integrated circuit 111 may be formed, for example, as a chip-on-film (COF) form. In one embodiment, the driving integrated circuit 111 may be separate from the PCB 112. In another embodiment, the driving integrated circuit 111 may be mounted on the PCB 112.

The display substrate 100 further includes a first pad unit or area 101 and a second pad unit or area 102 at different portions of the peripheral area PA. Referring to FIG. 1, the first pad unit 101 and the second pad unit 102 are disposed at opposite sides (e.g., a left side and a right side) of the display area DA. In the present embodiment, the first pad unit 101 is at a region adjacent to the connection pad unit 103 in the peripheral area PA of the display substrate 100. The second pad unit 102 is located at an opposite side of the first pad unit 101 with respect to the display area DA. For example, the second pad unit 102 is at a region opposite to the region of the first pad unit 101 and the connection pad unit 103.

Also, the first pad unit 101 and an overlapping connector (e.g., connection member) 200 are on a first surface of the display substrate 100 and second pad unit 102 is on an opposing surface of the display substrate 100. The first pad unit 101 may include a plurality of pads 101a, the second pad unit 102 may include a plurality of second pads 102a, and the connector 200 may include a plurality of connectors 200a.

The first pad unit 101 and the second pad unit 102 are electrically connected to different pixels. The first pad unit 101 and the second pad unit 102 supply power source voltages to corresponding pixels. The first pad unit 101 is directly electrically connected to the connection pad unit 103, for example, through connecting wires and contact holes. The first pad unit 101 receives the power source voltages from the connection pad unit 103 and supplies them to corresponding pixels.

The second pad unit 102 is electrically connected to the first pad unit 101 through connection member 200, to receive the power source voltages supplied to the first pad unit 101. The second pad unit 102 supplies the power source voltages from the first pad unit 101 to corresponding pixels. An embodiment of a structure in which the first pad unit 101 and the second pad unit 102 are electrically connected to each other through the connection member 200 will be described in detail with reference to FIG. 3.

Referring to FIGS. 2A and 2B, the display device 10 having the aforementioned structure may be a wrap-around display device, which visibly display images at 360-degrees by bending the display substrate 100 to have a cylindrical shape. In this shape, images displayed on the cylindrical display device 10 are visible in all directions, e.g., 360-degrees.

When the display device 10 is bent to have a cylindrical shape, the display substrate 100 may bend so that opposite ends overlap each other to a certain extent. This may improve image visibility by reducing or eliminating regions of discontinuity of the displayed image, e.g., to prevent a portion of the peripheral area PA from being visible between respective ends of the cylindrical display region DA.

When the opposite ends of the display substrate 100 overlap each other to a certain degree, the first pad unit 101 and the second pad unit 102, which are respectively adjacently disposed at the end portions, overlap each other. The first pad unit 101 and the second pad unit 102, which are arranged to overlap due to the bending of the display substrate 100, are electrically connected to each other by the connection member 200 between the first pad unit 101 and the second pad unit 102.

FIG. 3 illustrates an embodiment of a coupling structure between the first pad unit 101 and the second pad unit 102. FIG. 3 is an enlarged cross-sectional view of a cross-section of FIG. 2B. Referring to FIG. 3, the display substrate 100 is bent such that peripheral areas at opposite sides of the display area DA at least partially overlap each other. For example, the display substrate 100 is formed to have a bendable shape such that the first pad unit 101 and the second pad unit 102 are disposed to overlap each other. This may be achieved by allowing the peripheral area in which the first pad unit 101 is disposed and the peripheral area in which the second pad unit 102 is disposed to overlap each other.

The peripheral area in which the first pad unit 101 is disposed and the peripheral area in which the second pad unit 102 is disposed are respectively referred to as a first peripheral area PA1 and a second peripheral area PA2. Referring to FIGS. 2B and 3, the first peripheral area PA1 and the second peripheral area PA2 are disposed in opposite directions with respect to the display area DA. Further, the first and second peripheral areas PA1 and PA2 are respectively positioned at two end portions of the display substrate 100, which overlap (or are adjacent to) each other when display device 10 is in a cylindrical shape.

The first pad unit 101 and the second pad unit 102 are on different surfaces (e.g., a front surface and a rear surface) of the display substrate 100. The front surface of the display substrate 100 is a display surface of the display substrate 100 on which images are displayed. The rear surface of the display substrate 100 is opposite to the display surface. Since the first peripheral area PA1 and the second peripheral area PA2 overlap each other due to the bending of the display substrate 100, the first pad unit 101 on the front surface of the display substrate 100 and the second pad unit 102 on the rear surface of the display substrate 100 overlap and face each other.

The connection member 200 is between the first pad unit 101 and the second pad unit 102, and is made of a conductive material, e.g., a conductive adhering film. The first pad unit 101 and the second pad unit 102 respectively contact opposite surfaces of the connection member 200, and are electrically connected to each other by the connection member 200. The second pad unit 102 receives a power source voltage from the first pad unit 101.

The second pad unit 102 may be connected to a connection wire (or a connection pad) 302 on the front surface of the display substrate 100 through at least one contact hole 310, formed to extend through the display substrate 100. A power source voltage is supplied to the pixels on the front surface of the display substrate 100. The connecting wire 302, which is connected to the second pad unit 102 through the contact hole 310, is electrically connected to the pixels on the front surface of the display substrate 100. Accordingly, the power source voltage supplied through the second pad unit 102 is transferred to the corresponding pixels through the connection wire 302.

Figure 4:
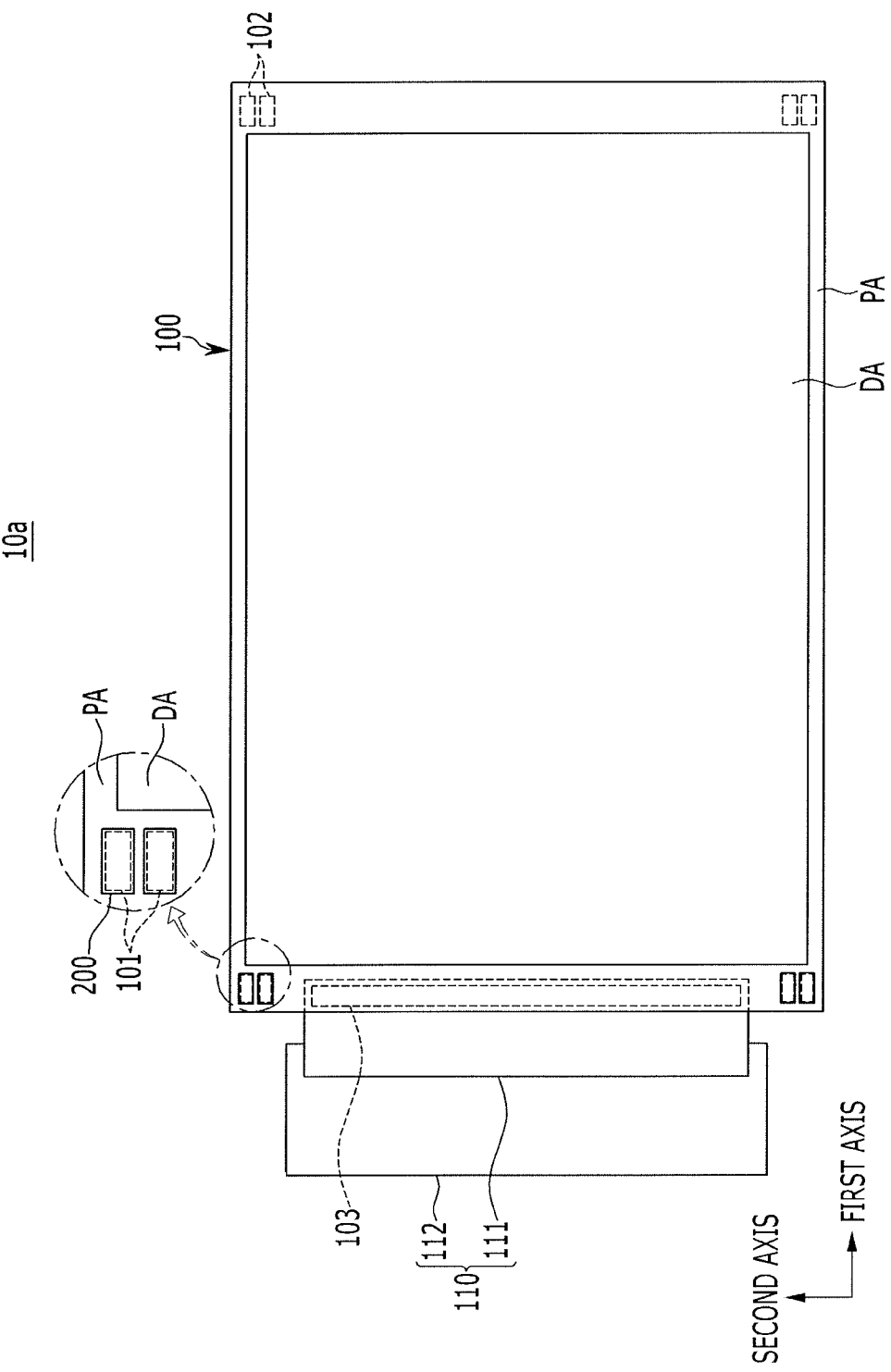
FIG. 4 illustrates another embodiment of a display device.
Figure 5:
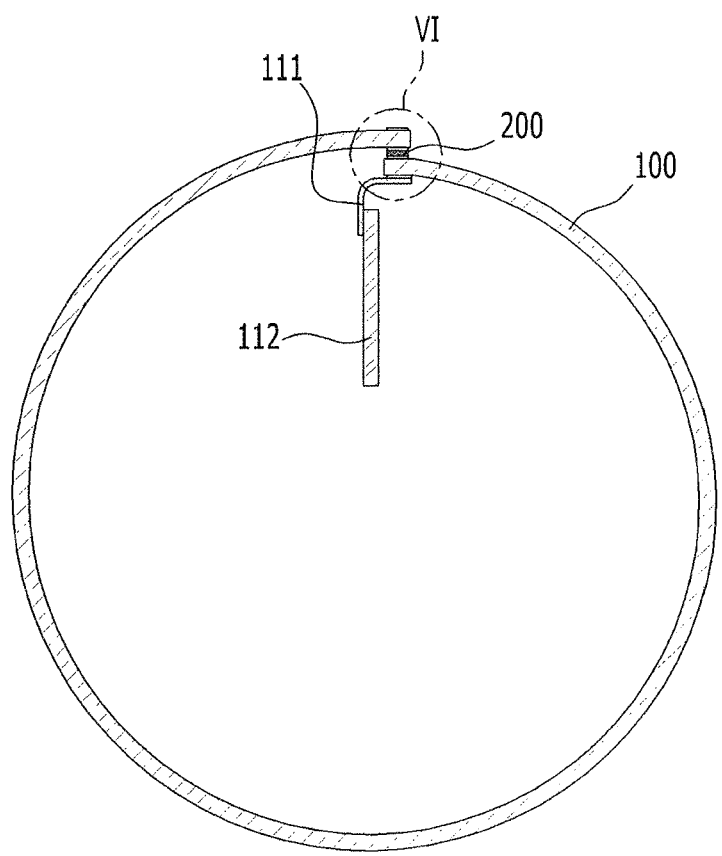
FIG. 5 illustrates another view of the display device in FIG. 4.
Figure 6:
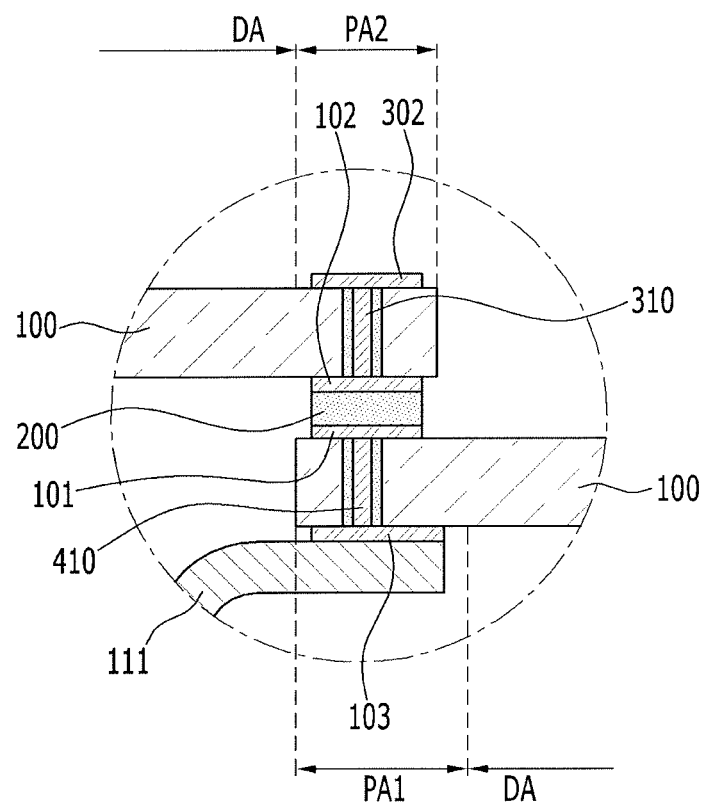
FIG. 6 illustrates an embodiment of a coupling structure in FIG. 5.

FIG. 4 illustrates another embodiment of a display device 10a. FIG. 5 illustrates a cross-sectional view of the display device 10a bent in the shape of a cylinder. FIG. 6 illustrates an enlarged cross-sectional view of a coupling structure of a first pad unit and a second pad unit at region VI in the display device 10a in FIG. 5.

The display device 10a is different from the display device 10 in that a surface of the display substrate 100 on which the first pad unit 101 is disposed is different from a surface to which the driver 110 is coupled.

Referring to FIGS. 4 to 6, in the display device 10a, the connection pad unit 103 is on the rear surface of the display substrate 100. The driver 110 contacts the connection pad unit 103 on the rear surface of the display substrate 100 through the driving integrated circuit 111, and thus is electrically connected to the connection pad unit 103. The first pad unit 101 is on a surface of the display substrate 100 different from the surface on which the connection pad unit 103 is disposed, e.g., the front surface of the display substrate 100.

In the display substrate 100, the first pad unit 101 and the connection pad unit 103, which are disposed on different surfaces, are electrically connected to each other through a contact hole 410 which is formed to extend the display substrate 100. Accordingly, the first pad unit 101 receives a power source voltage, which is transferred from the driving integrated circuit 111 to the connection pad unit 103, through the contact hole 410.

The second pad unit 102 is on a surface opposite to the first pad unit 101, e.g., the rear surface of the display substrate 100. Accordingly, when the display substrate 100 is bent into a cylindrical shape as illustrated, for example, in FIG. 2A, the first peripheral area PA1 and the second peripheral area PA2 overlap each other. Thus, the first pad unit 101 on the front surface of the display substrate 100 and the second pad unit 102 on the rear surface of the display substrate 100 are arranged to face each other. When the first pad unit 101 and the second pad unit 102 are arranged to face each other, they are electrically connected to each other by the connection member 200 between the first pad unit 101 and the second pad unit 102.

The second pad unit 102 receives a power source voltage from the first pad unit 101 through the connection member 200. Further, the second pad unit 102 is connected to the connecting wire (or the connection pad) 302 on the front surface of the display substrate 100 through at least one contact hole 310. Accordingly, the second pad unit 102 transfers the power source voltage transferred from the first pad unit 101 through the connecting wire 302.

In the display device according to this embodiment, the connection pad unit 103 and the first pad unit 101 overlap each other by disposing the connection pad unit 103, to which the driver 110 is coupled, on the rear surface of the display substrate 100. As a result, the size of the peripheral area is reduced or minimized.

Figure 7:
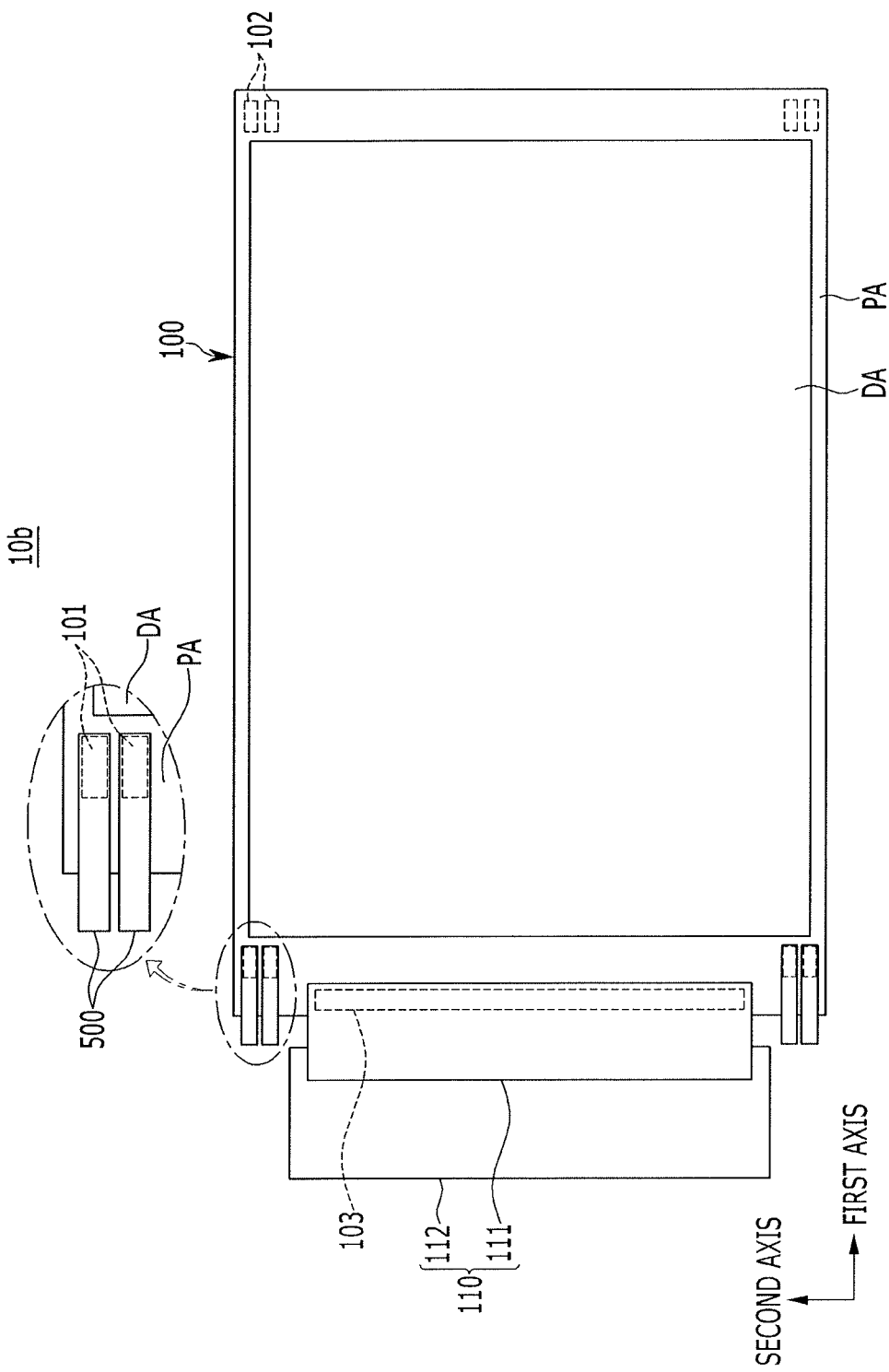
FIG. 7 illustrates another embodiment of a display device.
Figure 8:
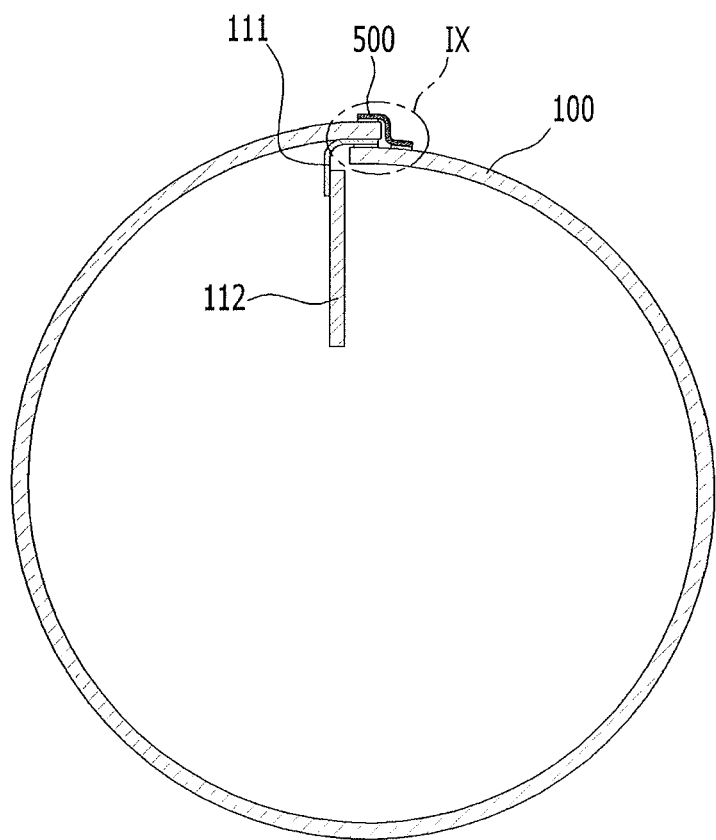
FIG. 8 illustrates another view of the display device in FIG. 7.
Figure 9:
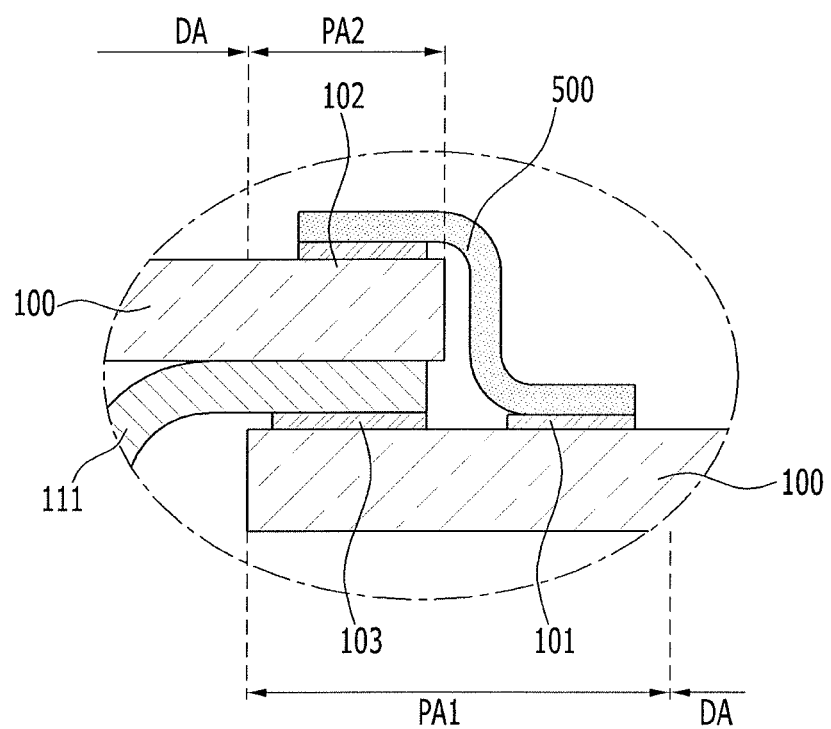
FIG. 9 illustrates an embodiment of a coupling structure in FIG. 8.

FIG. 7 illustrates another embodiment of a display device 10b. FIG. 8 illustrates a cross-sectional view of the display device 10b bent into the shape of a cylinder. FIG. 9 illustrates an enlarged cross-sectional view of a coupling structure of a first pad unit and a second pad unit at region IX in the display device 10b in FIG. 8. The display device 10b is different from the display device 10 in that the first pad unit 101 and the second pad unit 102 are on the same surface in the display substrate 100.

Referring to FIGS. 7 to 9, in the display device 10b, the connection pad unit 103 is on the front surface of the display substrate 100. The driver 110 contacts the connection pad unit 103 through the driving integrated circuit 111, and thus is electrically connected to the connection pad unit 103. The first pad unit 101 is on the same surface in the display substrate 100 as the connection pad unit 103, e.g., the front surface of the display substrate 100. The first pad unit 101 is electrically connected to the connection pad unit 103 to receive a power source voltage from the driver 110.

The first pad unit 101 and the second pad unit 102 are on the same surface in the display substrate 100, e.g., the front surface of the display substrate 100. When the display substrate 100 is bent into a cylindrical shape as illustrated, for example, in FIG. 2A, the first pad unit 101 and the second pad unit 102 are misaligned and do not overlap each other. For example, the first pad unit 101 and the second pad unit 102 are arranged to be adjacent to each other to within a predetermined distance.

The first pad unit 101 and the second pad unit 102, which are adjacently disposed, are electrically connected through a conductive connection member 500.

When opposite ends of the display substrate 100 partially overlap each other as illustrated in FIG. 8, and when the display device 10b is bent in a cylindrical shape in order to improve the visibility of images, the first pad unit 101 and the second pad unit 102 are on different planes. The connection member 500 may be formed to include a flexible material, in order to allow the first pad unit 101 to connect to the second pad unit 102 on different planes. For example, connection member 500 may be formed of a conductive adhering film, a flexible printed circuit board (PCB), or the like. The second pad unit 102 receives a power source voltage from the first pad unit 101 through the connection member 500 and transfers the power source voltage to the pixels.

In this embodiment, the second pad unit 102 is on the same surface as the pixels in the display substrate 100. Accordingly, it is possible to directly connect the second pad unit 102 to corresponding pixels through a connector (e.g., a wire) without having to include an additional contact hole.

Figure 10:
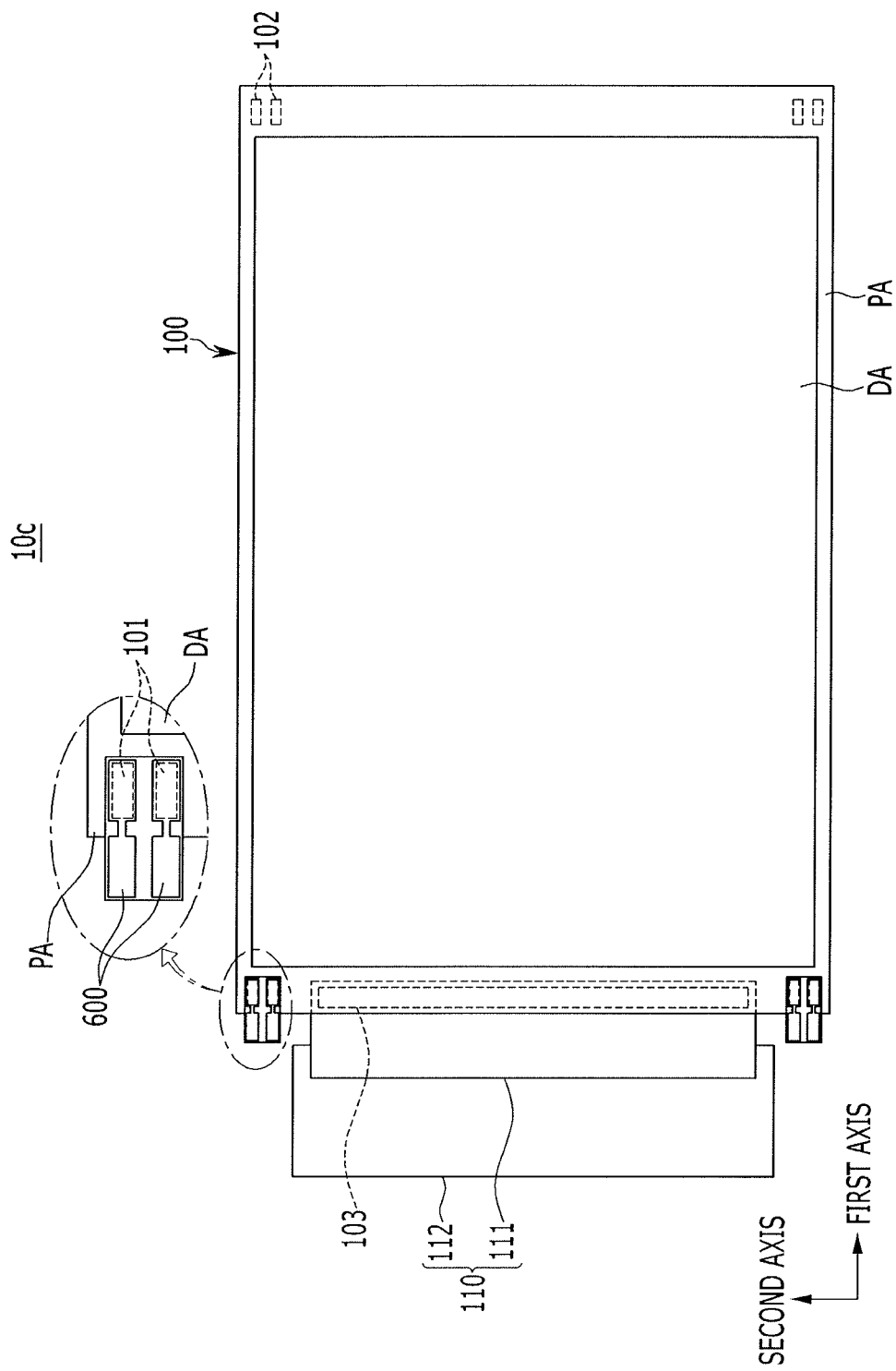
FIG. 10 illustrates another embodiment of a display device.
Figure 11:
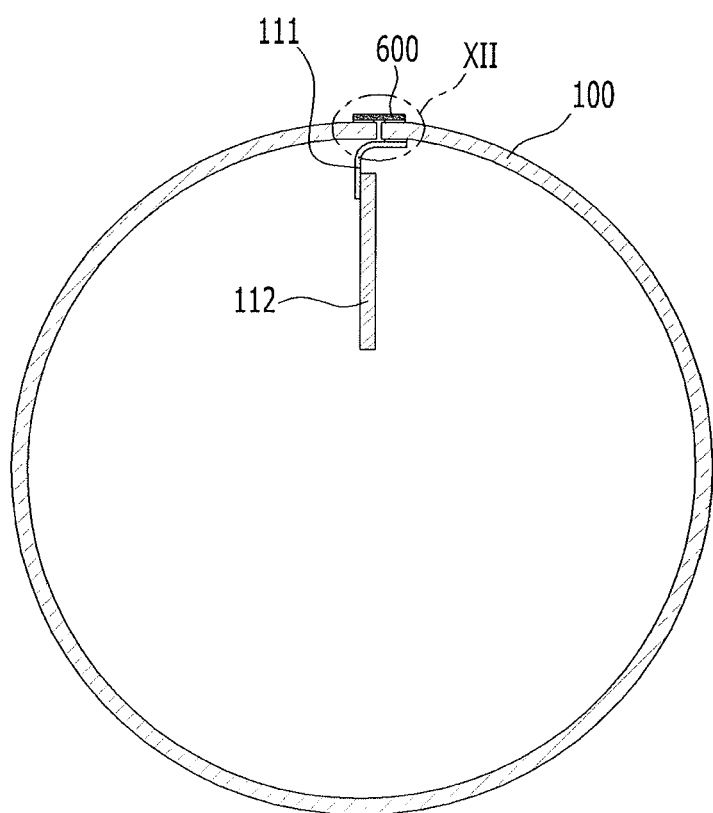
FIG. 11 illustrates another view of the display device in FIG. 10.
Figure 12:
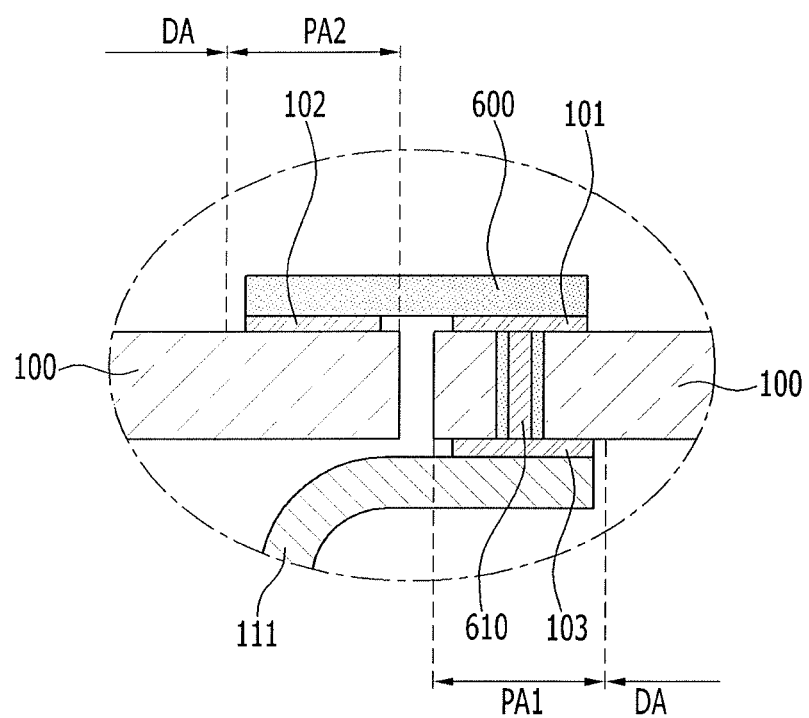
FIG. 12 illustrates an embodiment of a coupling structure in FIG. 11.

FIG. 10 illustrates another embodiment of a display device 10c. FIG. 11 illustrates a cross-sectional view of the display device 10c bent in a cylindrical shape. FIG. 12 illustrates an enlarged cross-sectional view of a coupling structure of a first pad unit and a second pad unit at region XII in the display device 10c in FIG. 11. The display device 10c is different from the display device 10 in that the first pad unit 101 and the second pad unit 102 are on the same surface and the connection pad unit 103 is on a surface different from the first pad unit 101 in the display substrate 100.

Referring to FIGS. 10 to 12, in the display device 10c, the connection pad unit 103 is on the rear surface of the display substrate 100. The driver 110 contacts the connection pad unit 103 on the rear surface of the display substrate 100 through the driving integrated circuit 111, and thus is electrically connected to the connection pad unit 103. The first pad unit 101 is on a surface in the display substrate 100 different from the surface on which the connection pad unit 103 is disposed, e.g., the front surface of the display substrate 100.

In the display substrate 100, the first pad unit 101 and the connection pad unit 103, which are disposed on the different surfaces, are electrically connected to each other through a contact hole 610 formed to extend the display substrate 100. Accordingly, the first pad unit 101 receives a power source voltage, which is transferred from the driving integrated circuit 111 to the connection pad unit 103, through the contact hole 610. The first pad unit 101 and the second pad unit 102 are on the same surface in the display substrate 100, e.g., the front surface of the display substrate 100.

In this embodiment, the first pad unit 101 and the second pad unit 102 are on the same surface in the display substrate 100. When the display device 10c is bent in the shape of a cylinder, for example, as in FIG. 2A, the display substrate 100 is bent such that opposite end portions thereof are adjacent to each other within a predetermined distance, instead of overlapping each other. Accordingly, the first pad unit 101 and the second pad unit 102 are adjacently arranged. The first pad unit 101 and the second pad unit 102, which are adjacently disposed, are electrically connected to each other through a conductive connection member 600.

The connection member 600 may be, for example, a conductive adhering film or a PCB. In this embodiment, the first pad unit 101 and the second pad unit 102 are arranged on the same plane when the display substrate 100 is bent. These first and second pad units 101 and 102 may be on different planes in another embodiment. The second pad unit 102 receives a power source voltage from the first pad unit 101 through the connection member 600, and transfers the power source voltage to the pixels.

In this embodiment, the second pad unit 102 is on the same surface as the pixels in the display substrate 100. Accordingly, it is possible to directly connect the second pad unit 102 to the corresponding pixels through a connector (e.g., a wire) without having to include an additional contact hole.

Figure 13:
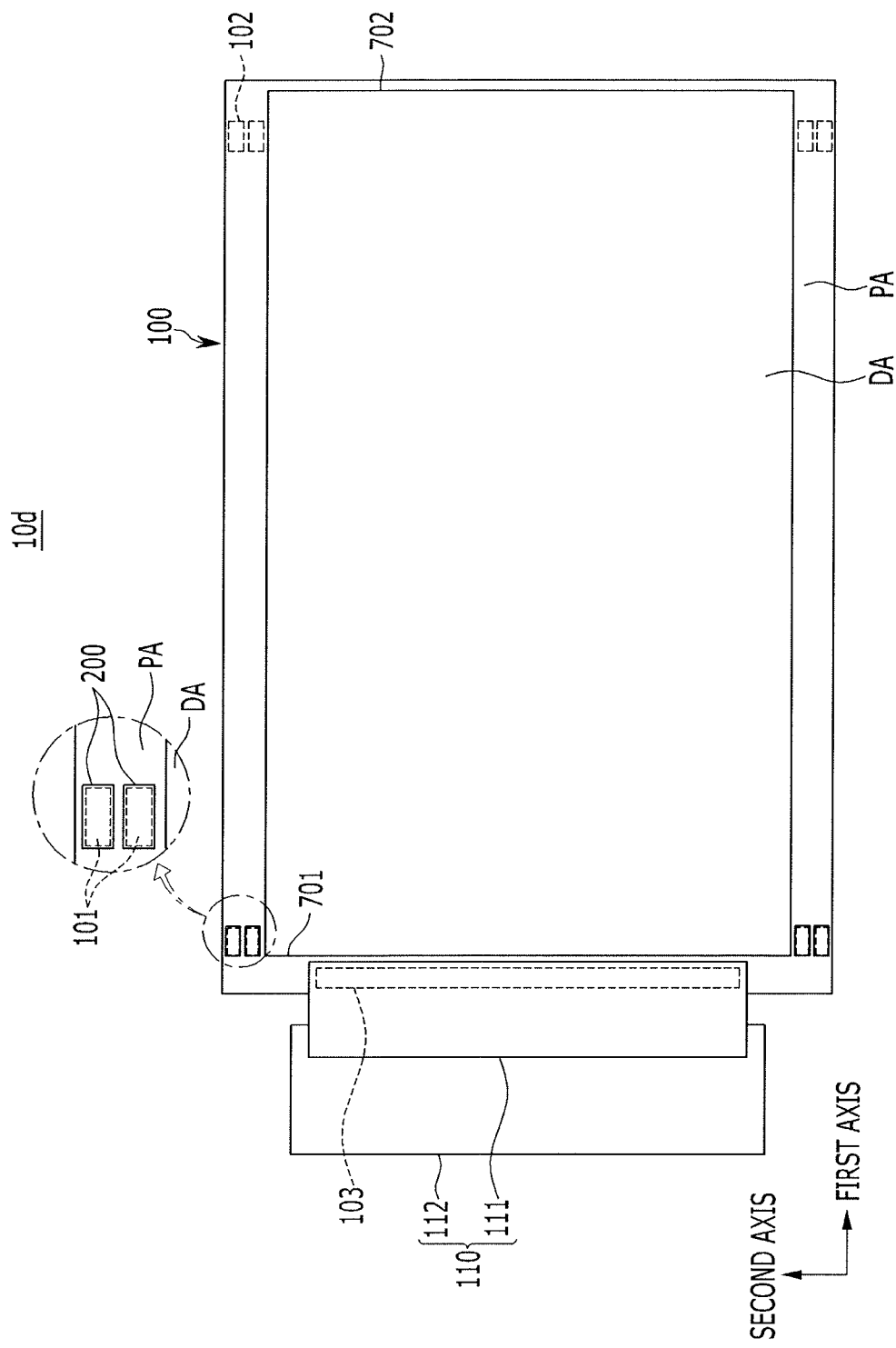
FIG. 13 illustrates another embodiment of a display device.
Figure 14:
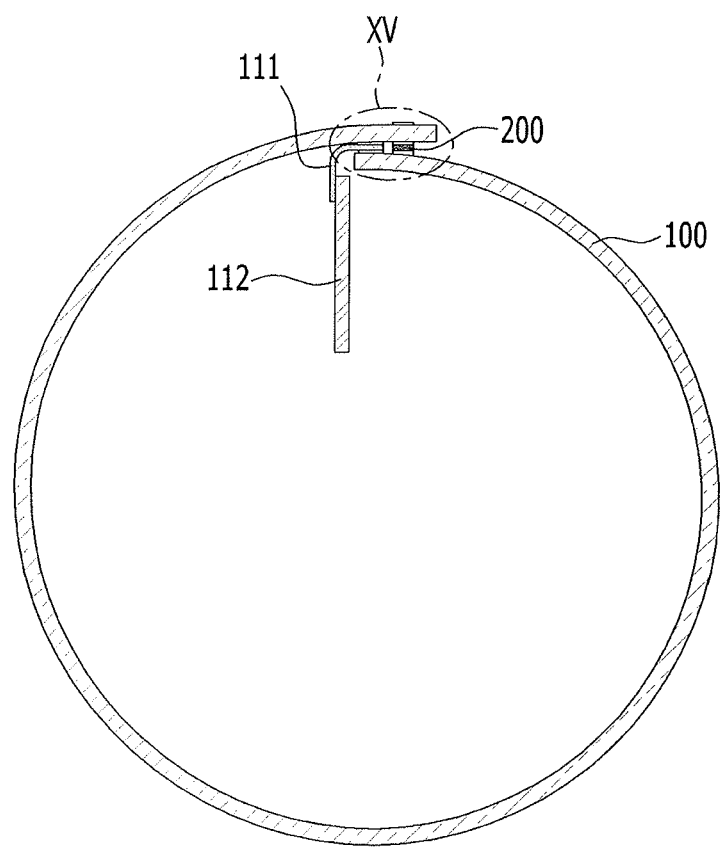
FIG. 14 illustrates another view of the display device in FIG. 13.
Figure 15:
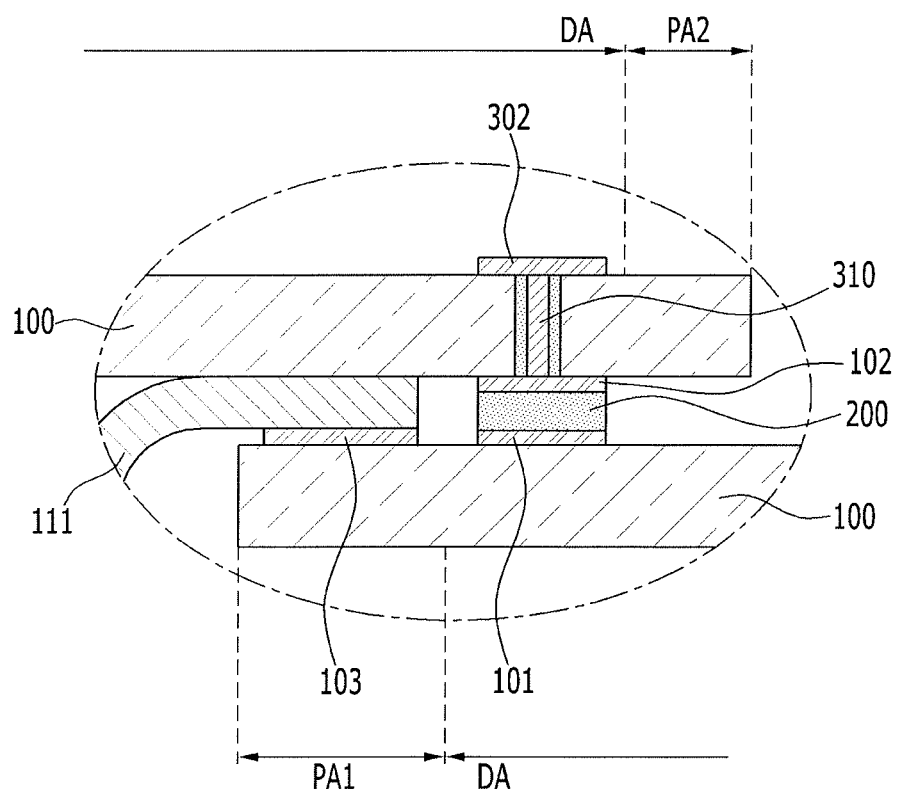
FIG. 15 illustrates an embodiment of a coupling structure in FIG. 14.

FIG. 13 illustrates another embodiment of a display device 10d. FIG. 14 illustrates the display device 10d bent in a cylindrical shape. FIG. 15 is an enlarged cross-sectional view of a coupling structure of a first pad unit and a second pad unit at region XII in the display device 10d in FIG. 14. Referring to FIGS. 13 to 15, the display device 10d is different from the display device 10 in that the first pad unit 101 and the second pad unit 102 are closer to the center of the display area DA than opposite side (left or right) boundaries 701 and 702 of the display area DA.

As such, when the display device 10d is bent into a cylindrical shape, for example, as illustrated in FIG. 2A, the distance between the opposite boundaries 701 and 702 of the display area DA is reduced. Accordingly, the distance between opposite end portions of an image displayed on the cylindrical display device 10 is also reduced, thereby improving the continuity of the image.

In the aforementioned embodiments, the display substrate 100 is bent into a cylindrical shape. In another embodiment, the display device 10 may be bent into other shapes including but not limited to an elliptical shape or a quadrangular shape.

Further, in the aforementioned embodiments, the first pad unit 101 and the second pad unit 102 serve as a power source voltage pad unit for supplying a power source voltage to the pixels. In another embodiment, the first pad unit 101 and the second pad unit 102 may serve as a signal pad unit for supplying a driving signal (e.g., a gate signal or a data signal) to the pixels.

In the aforementioned embodiments, the display device 10 supplies power source voltages to different pixels in different directions through the first pad unit 101 and the second pad unit 102, which are respectively disposed at opposite end portions of the display substrate 100. Accordingly, it is possible to reduce voltage drop (IR DROP) generated based on different distances between the pads for supplying power source voltages and the pixels in the display substrate 100. As a result, luminance deviation caused by such a voltage drop may be reduced. Particularly, as shown in FIG. 2A, in the case of the cylindrical display device 10 in which images are visible in 360-degrees, it is possible to reduce or prevent the quality of images from being adversely affected by luminance deviation.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A display device, comprising:
  a substrate including a display area, a first pad area, a second pad area, and a third pad area, the display area including a plurality of pixels, the second pad area being adjacent to respective sides of the display area and connected to the pixels, and the third pad area directly transferring a power source voltage to the plurality of pixels; and
  a connector to electrically connect the first pad area and the second pad area when the substrate is bent, wherein
  the first and second pad areas are disposed over opposite sides of the substrate and the display area is between the first and second pad areas, and
  the second and third pad areas transfer the power source voltage to corresponding pixels.

2. The display device as claimed in claim 1, wherein the first pad area and the second pad area are on respective first and second surfaces of the substrate and overlap each other when the substrate is bent.

3. The display device as claimed in claim 2, wherein the first pad area and the third pad area are adjacent on the first surface of the substrate and are electrically connected to each other through a connecting wire on the first surface of the substrate.

4. The display device as claimed in claim 2, wherein:
  the connector is between the first pad area and the second pad area, and
  the first pad area and second pad area respectively contact opposite surfaces of the connector.

5. The display device as claimed in claim 2, wherein:
  the first pad area and the second pad area are on the first surface of the substrate and the third pad area is on the second surfaces of the substrate, and
  the first pad area and the third pad area are electrically connected to each other through at least one contact hole through the substrate.

6. The display device as claimed in claim 5, wherein:
  the connector between the first pad area and the second pad area, wherein the first pad area and second pad area respectively contact opposite surfaces of the connector,
  the pixels are on the first surface of the substrate, and
  the second pad area is electrically connected to corresponding pixels through at least one contact hole through the substrate.

7. The display device as claimed in claim 1, wherein the first pad area and the second pad area are on the same substrate.

8. The display device as claimed in claim 7, wherein:
  the connector between the first pad area and the second pad area, and
  the first pad area and second pad area contact same surfaces of the connector when the substrate is bent.

9. The display device as claimed in claim 8, wherein:
  the first pad area and the third pad area are adjacent on the first surface of the substrate, and
  the connector includes a flexible material.

10. The display device as claimed in claim 1, wherein:
  the first pad area is between a boundary of the display area and a first end portion of the substrate, and
  the second pad area is between the boundary of the display area and a second end portion of the substrate.

11. The display device as claimed in claim 10, wherein opposite end portions of the substrate overlap to within a predetermined distance when the substrate is bent.

12. The display device as claimed in claim 10, wherein opposite end portions of the substrate are adjacent one another to within a predetermined distance when the substrate is bent.

13. The display device as claimed in claim 1, further comprising a driver to supply a power source voltage to the third pad area.

14. The display device as claimed in claim 1, wherein the substrate has a cylindrical shape when bent.

* * * * *